United States Patent
Colas et al.

(10) Patent No.: US 10,409,086 B2
(45) Date of Patent: Sep. 10, 2019

(54) METHOD FOR OPTIMIZING A FRESNEL OPTICAL LENS

(71) Applicant: Essilor International, Charenton le Pont (FR)

(72) Inventors: Pauline Colas, Charenton le Pont (FR); Carlos Rego, Charenton le Pont (FR); Bruno Amir, Charenton le Pont (FR); Melanie Tessieres, Charenton le Pont (FR)

(73) Assignee: Essilor International, Charenton le Pont (FR)

( * ) Notice: Subject to any disclaimer, the term of this patent is extended or adjusted under 35 U.S.C. 154(b) by 0 days.

(21) Appl. No.: 14/652,061

(22) PCT Filed: Dec. 10, 2013

(86) PCT No.: PCT/EP2013/076143
§ 371 (c)(1),
(2) Date: Jun. 12, 2015

(87) PCT Pub. No.: WO2014/090833
PCT Pub. Date: Jun. 19, 2014

(65) Prior Publication Data
US 2015/0323810 A1    Nov. 12, 2015

(30) Foreign Application Priority Data
Dec. 12, 2012   (EP) .................................... 12306570

(51) Int. Cl.
*G02C 7/02*    (2006.01)

(52) U.S. Cl.
CPC ......... *G02C 7/025* (2013.01); *G02C 2202/20* (2013.01)

(58) Field of Classification Search
CPC ...... G02C 7/02; G02C 2202/20; G02C 7/025; G02C 2202/22; G02C 7/024; G02C 7/027;
(Continued)

(56) References Cited

U.S. PATENT DOCUMENTS 8,197,062 B1    6/2012  Morrison
2008/0123048 A1*  5/2008  Volk ..................... G02C 7/061
                                                 351/159.42
(Continued)

FOREIGN PATENT DOCUMENTS

WO    WO 2005/103815    11/2005

*Primary Examiner* — Evan P Dzierzynski
*Assistant Examiner* — Alberto J Betancourt
(74) *Attorney, Agent, or Firm* — Oblon, McClelland, Maier & Neustadt, L.L.P.

(57) ABSTRACT

Method means for optimizing an optical lens adapted to a wearer, using an initial optical system providing stage (S1), during which an initial optical system is provided. The initial optical system has at least a light source (10), a light receiver (12) and an initial optical lens (L0) placed between the source (10) and the receiver (12), the initial optical lens a Fresnel zone, a working optical lens defining stage (S2), for evaluating a working optical lens is defined to be equal to the initial optical lens (L0), an evaluation stage (S3), during which a cost function related to the number of light rays received by the light receiver (12) that have passed through the annular step of the working optical lens, a modifying stage (S4), for modifying the annular step of the working optical lens, wherein the evaluation and modifying steps are repeated to minimize the cost function.

14 Claims, 6 Drawing Sheets

(58) Field of Classification Search
CPC .......... G02C 7/028; G02C 7/04; G02C 7/044; G02C 7/049; G02C 2202/06; G02C 7/045; G02C 7/046; G02B 3/08; G02B 5/1876
USPC ............ 351/159.76, 159.01, 159.02, 159.05, 351/159.06, 159.07, 159.09, 159.1, 351/159.11, 159.12, 159.14, 159.73, 351/159.74, 159.75, 159.77; 359/742–743

See application file for complete search history.

(56) References Cited

U.S. PATENT DOCUMENTS

| | | | |
|---|---|---|---|
| 2010/0060195 A1* | 3/2010 | Tsuboi .................. | A61M 21/00 315/294 |
| 2011/0128412 A1* | 6/2011 | Milnes .................. | G02B 27/22 348/231.99 |
| 2011/0202286 A1* | 8/2011 | De Rossi ................. | G02C 7/02 702/19 |
| 2012/0081910 A1 | 4/2012 | Saito | |

* cited by examiner

METHOD FOR OPTIMIZING A FRESNEL OPTICAL LENS

RELATED APPLICATIONS

This is a U.S. national stage application under 35 USC § 371 of application No. PCT/EP2013/076143, filed on Dec. 10, 2013. This application claims the priority of European application no. 12306570.8 filed Dec. 12, 2012, the entire content of which is hereby incorporated by reference.

FIELD OF THE INVENTION

The invention relates to a method implemented by computer means for optimizing an optical lens adapted to a wearer and to a method of manufacturing an optical lens for a wearer.

BACKGROUND OF THE INVENTION

The discussion of the background of the invention herein is included to explain the context of the invention. This is not to be taken as an admission that any of the material referred to was published, known or part of the common general knowledge at the priority date of any of the claims.

There is an increasing interest in ophthalmic lens having a Fresnel zone for certain ophthalmic applications in lieu of more conventional refractive lenses. Among the reasons for the increased interest in Fresnel lenses for ophthalmic applications is to increase lens optical power and/or reduced lens thickness and therefore they are also referred to as "thin lenses with high power". One problem of ophthalmic lenses having Fresnel zones is that the wearer may observe parasite images when wearing such ophthalmic lens. Such parasite images are produced by the Fresnel zones and may annoyed the wearer.

SUMMARY OF THE INVENTION

Therefore, there is a need for a method of optimizing the Fresnel zone of an ophthalmic lens so as to reduce such parasite images.

To this end, one aspect of the invention is directed to a method implemented by computer means for optimizing an optical lens adapted to a wearer, the method comprising:
- an initial optical system providing stage, during which an initial optical system is provided, the initial optical system comprising at least a light source, a light receiver and an initial optical lens placed between the light source and the light receiver, the initial optical lens comprising at least a Fresnel zone, the Fresnel zone comprising at least two discontinuous optically functional annular sections joined by at least one annular step,
- a working optical lens defining stage, during which a working optical lens is defined to be equal to the initial optical lens,
- an evaluation stage, during which a cost function related to the number of light rays received by the light receiver from the light source that have passed through the annular step of the working optical lens is evaluated,
- a modifying stage, during which the annular step of the working optical lens is modified,
wherein the evaluation and modifying steps are repeated so as to minimize the cost function.

The inventors have observed that the parasite images are due to the annular step of the Fresnel structure. The method according to the invention allows optimizing the annular steps so as to reduce the number of light rays received by the wearer and having passed through the annular step, thus reducing the parasite images the wearer may observe while wearing the optical lens.

According to further embodiments which can be considered alone or in combination:
- during the modifying stage the angle and/or position and/or cross-section shape of the annular step is modified; and/or
- the cost function is calculated by attributing different weights to each light ray received by the light receiver according to the zone of the light receiver that receives the light ray; and/or
- the light receiver consists in the locus of the wearer's pupil points when the wearer's eye rotates in all directions; and/or
- the light receiver is divided in three zones, the first zone corresponding to the central vision zone, the second zone corresponding to the intermediate vision zone and the third zone corresponding to the peripheral vision zone; and/or
- the cost function is calculated by attributing different weights to each light ray received by the light receiver according to the angle of incidence with which the light ray is received by the light receiver; and/or
- the cost function is calculated by attributing different weights to each light ray received by the receiver according to their photometric energy; and/or
- the Fresnel zone comprises a plurality of discontinuous optically functional annular sections joined by a plurality of annular steps and the method further comprises an evaluation zone providing stage during which an evaluation zone of the Fresnel zone is provided and the evaluation stage is carried out only for the annular steps comprised in the evaluation zone; and/or
- the evaluation zone comprises a plurality of annular steps and the cost function is calculated by attributing different weights to each light ray received by the light receiver according to which annular step the light ray has passed through before being received by the receiver; and/or
- the initial optical system comprises a plurality of light sources; and/or
- the cost function is calculated by attributing different weights to each light ray received by the light receiver according to which light source the light ray is issued; and/or
- the light sources energy and distribution are adapted to correspond to a visual situation.

Another aspect of the invention relates to a method of manufacturing an optical lens for a wearer, the method comprising:
- an optical lens data providing stage during which optical lens data corresponding to the optimized optical lens according to the method of any of the preceding claims is provided,
- a manufacturing stage during which the optimized optical lens is manufactured.

Another aspect of the invention relates to a computer program product comprising one or more stored sequences of instructions that are accessible to a processor and which, when executed by the processor, causes the processor to carry out the stages of the method according to an embodiment of the invention.

Another aspect of the invention relates to a computer readable medium carrying one or more sequences of instructions of the computer program product according to an embodiment of the invention.

Another aspect of the invention relates to a program which makes a computer execute the method of the invention.

Another aspect of the invention relates to a computer-readable storage medium having a program recorded thereon; where the program makes the computer execute the method according to an embodiment of the invention.

Another aspect of the invention relates to a device comprising a processor adapted to store one or more sequence of instructions and to carry out at least one of the stages of the method according to an embodiment of the invention.

Unless specifically stated otherwise, as apparent from the following discussions, it is appreciated that throughout the specification discussions utilizing terms such as "computing", "calculating", "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

Non limiting embodiments of the invention will now be described with reference to the accompanying drawings in which.

DETAILED DESCRIPTION OF THE DRAWINGS

Elements in the figures are illustrated for simplicity and clarity and have not necessarily been drawn to scale. For example, the dimensions of some of the elements in the figure may be exaggerated relative to other elements to help improve the understanding of the embodiments of the present invention.

Figure 1:
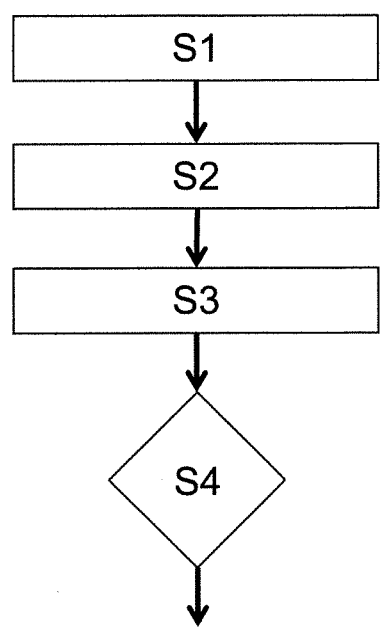
FIG. 1 is flowchart representing the steps of a method according to an embodiment of the invention.

According to an embodiment of the invention illustrated on FIG. 1, the method for optimizing an optical lens adapted to a wearer according to the invention comprises at least:

an initial optical system providing stage S1,
a working optical lens defining stage S2,
an evaluation stage S3, and
a modifying stage S4.

An initial optical system is provided during the initial optical system providing stage S1. An example of initial optical system is represented on FIG. 2. The initial optical system comprises at least a light source 10, a light receiver 12 and an initial optical lens L0 placed between the light source 10 and the light receiver 12. The initial optical lens L0 comprises a Fresnel zone, the Fresnel zone comprising at least two discontinuous optically functional annular sections 14, 16 joined by at least one annular step 18.

The annular step may be defined by its cross-section shape, angular orientation relative to the optically functional annular sections and position, i.e. height and width of the annular step.

Figure 2:
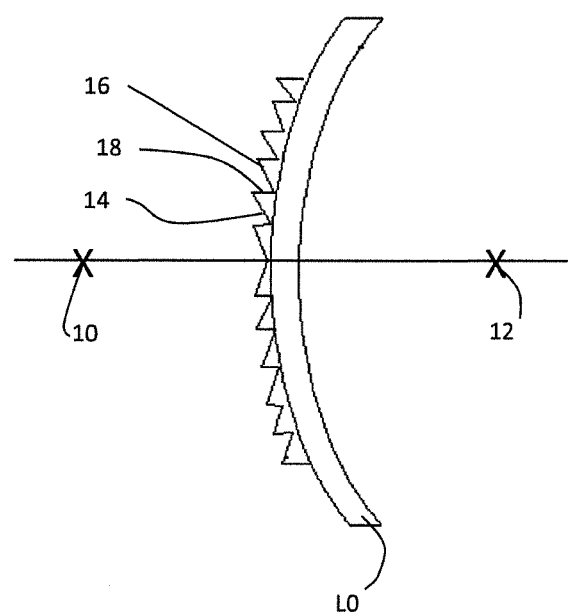
FIG. 2 is schematic view of an initial optical system according to embodiments of the invention.

In the embodiment represented on FIG. 2, the Fresnel zone comprises a plurality of discontinuous optically functional annular sections joined by a plurality of annular steps.

While in this embodiment of the invention, the Fresnel zone is on the front surface of the initial optical lens, it will be understood, that in alternative embodiments of the invention the Fresnel zone may be on the back surface of the initial optical lens.

Moreover, although the Fresnel zone is on a surface represented in FIG. 2 as convex, it will be appreciated that this surface could equally well be concave or any other curved surface.

Figure 3:
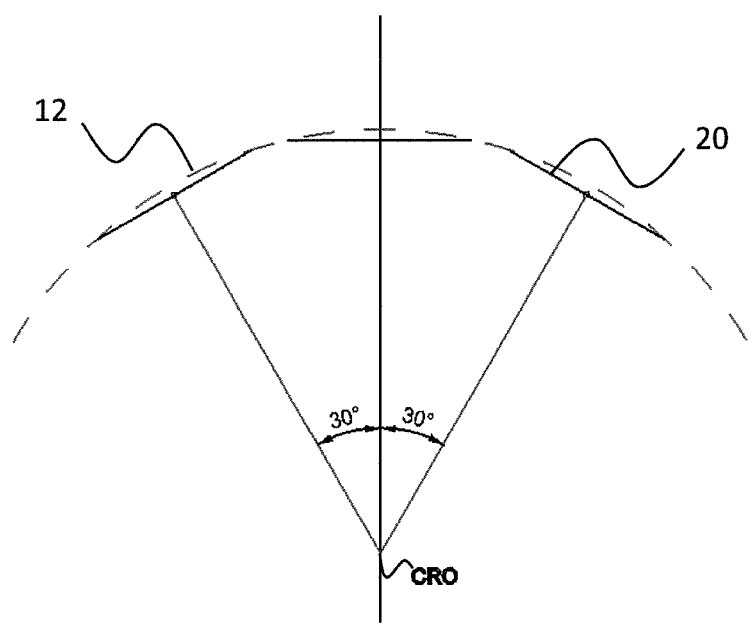
FIG. 3 is schematic view of light receiver according to embodiments of the invention.

According to an embodiment of the invention represented on FIG. 3, the light receiver 12 may consist in the locus of the wearer's pupil 20 points when the wearer's eye rotates in all directions around the wearer's eye center of rotation CRO. For example, the wearer's pupil may have a diameter of about 6 mm and the distance between the pupil 20 and the eye center of rotation CRO may be set to about 13.5 mm. The angular distance between the center of the pupil in the extreme positions may be set to about 30° on each side of the main gazing direction.

The light receiver 12 as defined on FIG. 3 may be divided in different zone, for example three zones.

The first zone Z1 corresponds to the central vision zone. The first zone Z1 may be defined as having an angle of about 12.5° on each side of the main gazing direction.

The second zone Z2 corresponds to the intermediate vision zone and may be defined as having an angle comprised between 12.5° and 30° on each side of the main gazing direction.

The third zone Z3 corresponds to the peripheral vision zone and may be defined as having an angle greater than 30° on each side of the main gazing direction.

Advantageously, defining the light receiver as illustrated on FIG. 3 corresponds to a good representation of the wearer's eye and increases the accuracy of the optimization method.

According to an embodiment of the invention, the initial optical system may comprise a plurality of light sources. The plurality of light sources and the energy of each light source may be distributed to correspond to a visual situation.

For example, if the optical lens is to be used preferably to watch a screen; the light sources may have a greater density and energy in a zone corresponding to central vision. Whereas if the optical lens is to be used preferably to walk outside; the light sources may have an isotropic distribution. For example, the light source may consist in isotropic point sources distributed over a circular arc in the horizontal plane around the initial optical lens every 5° covering an angular range of −85° to 85°, each light source being considered with an equal energy.

During the working optical lens defining stage S2, a working optical lens is defined to be equal to the initial optical lens. In particular the working optical lens defined in the working optical lens defining stage S2 has the same Fresnel zone as the initial optical lens.

During the evaluation stage S3, a cost function related to the number of light rays received by the light receiver from the light source that have passed through an annular step of the working optical lens is evaluated.

The cost function may be defined by attributing different weights to each light ray received according to different criteria.

According to an embodiment of the invention, wherein the light receiver corresponds to the light receiver illustrated on FIG. 3, the cost function may attribute different weights to each light ray received by the light receiver according to the zone of the light receiver that receives the light ray. An example of a weighting function based on the zone of the light receiver is illustrated on FIG. 4. In the example illustrated on FIG. 4 the weighting function eliminates from the cost function the light rays that arrive in Zone 3, i.e. in peripheral vision to considers only the light rays that arrive in Zone 1 and 2 of the light receiver, i.e. in central and intermediate vision zone. A weight of 1 is applied to the light rays that arrive in Zone 1 and a decreasing weight based on where the light ray arrives is applied when the light ray arrives in Zone 2.

Figure 5A:
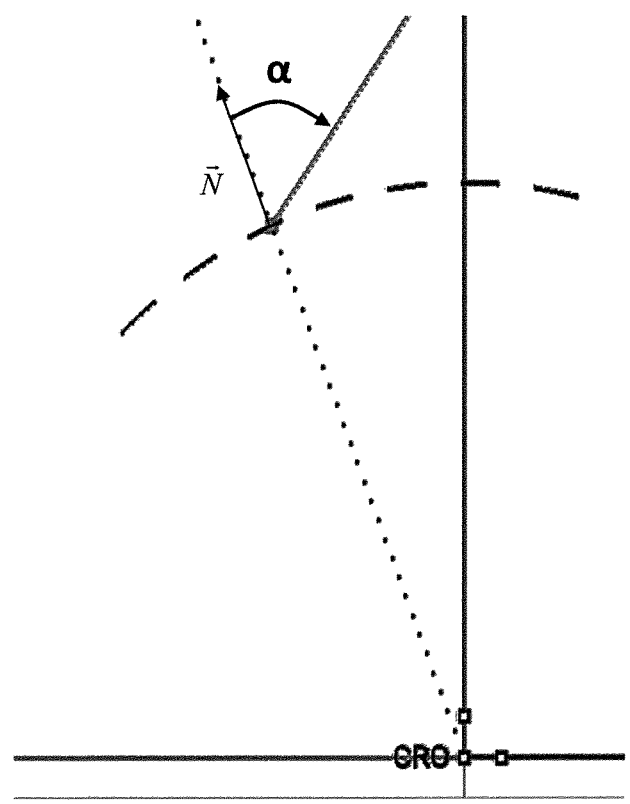
FIG. 5a is a schematic representation a light ray arriving on a light receiver according to an embodiment of the invention.
Figure 5B:
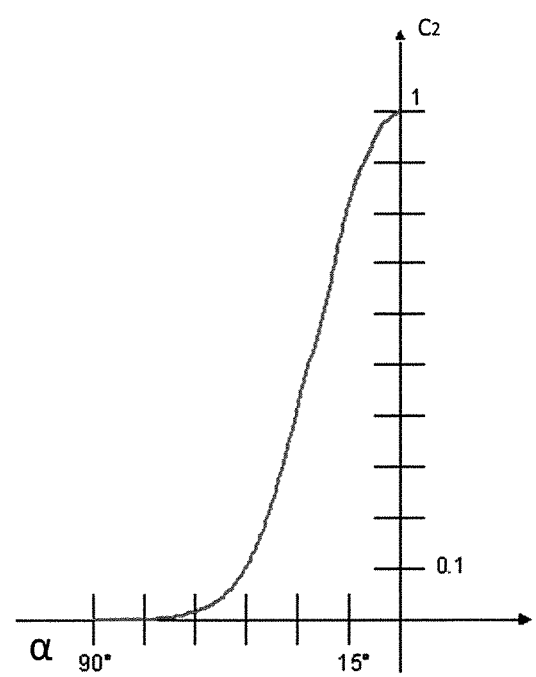
FIG. 5b represents an example a weighting function according to an embodiment of the invention.

According to an embodiment of the invention illustrated on FIGS. 5a and 5b, the cost function may attribute different weights to each light ray received by the light receiver according to the angle of incidence with which the light ray is received by the light receiver. As illustrated on FIG. 5a, the angle of incidence may be defined as the angle α between the light ray and the normal to the light receiver. As illustrated on FIG. 5b, the cost function may attribute a greater weight to the light rays that arrive with a small angle of incidence α and a smaller weight to the light rays that arrive with greater angles of incidence α.

According to an embodiment of the invention, the cost function may attribute different weights to each light ray received by the light receiver according to their photometric energy. For example, all the light rays emitted by the light source are considered as having an equal photometric energy and each light ray is considered as losing a given amount of photometric energy each time they pass through an optical diopter of the optical lens.

According to an embodiment of the invention, the light source comprises a plurality of light source and the cost function may be calculated by attributing different weights to each light ray according to which light source the light ray is issued. Therefore, the optimization may be adapted to a visual situation for which the optical lens is to be used. For example, the optical lens may be specifically adapted to be used to watch a screen, read, drive or walk and the cost function may be adapted so as to optimize the Fresnel zone of such specific use of the optical lens.

According to an embodiment of the invention, the Fresnel zone comprises a plurality of discontinuous optically functional annular sections joined by a plurality of annular steps. The method may comprise an evaluation zone providing stage. During the evaluation zone providing stage an evaluation zone of the Fresnel zone is provided and the evaluation stage is carried out only for the annular steps comprised in the evaluation zone.

The cost function may be calculated by attributing different weights to each light ray received by the light receiver according to which annular step the light ray has passed through before being received by the receiver. For example, the light ray that have passed through the center annular step, i.e. the steps closest to the optical center of the lens, may have a greater weight than the light rays that have passed through the decentered steps.

According to an embodiment of the invention, the cost function may be calculated by combining different weighting functions. For example, the cost function could be defined as:

$$Fm = \sum_{Z1}[(P_i \times C_{1i} \times C_{2i}) + (\beta \times Nb_{Z1})] \times \left[\sum_{Z2}(P_i \times C_{1i} \times C_{2i})\right] \Big/ (Nb_{Z2} + 1)$$

Figure 4:
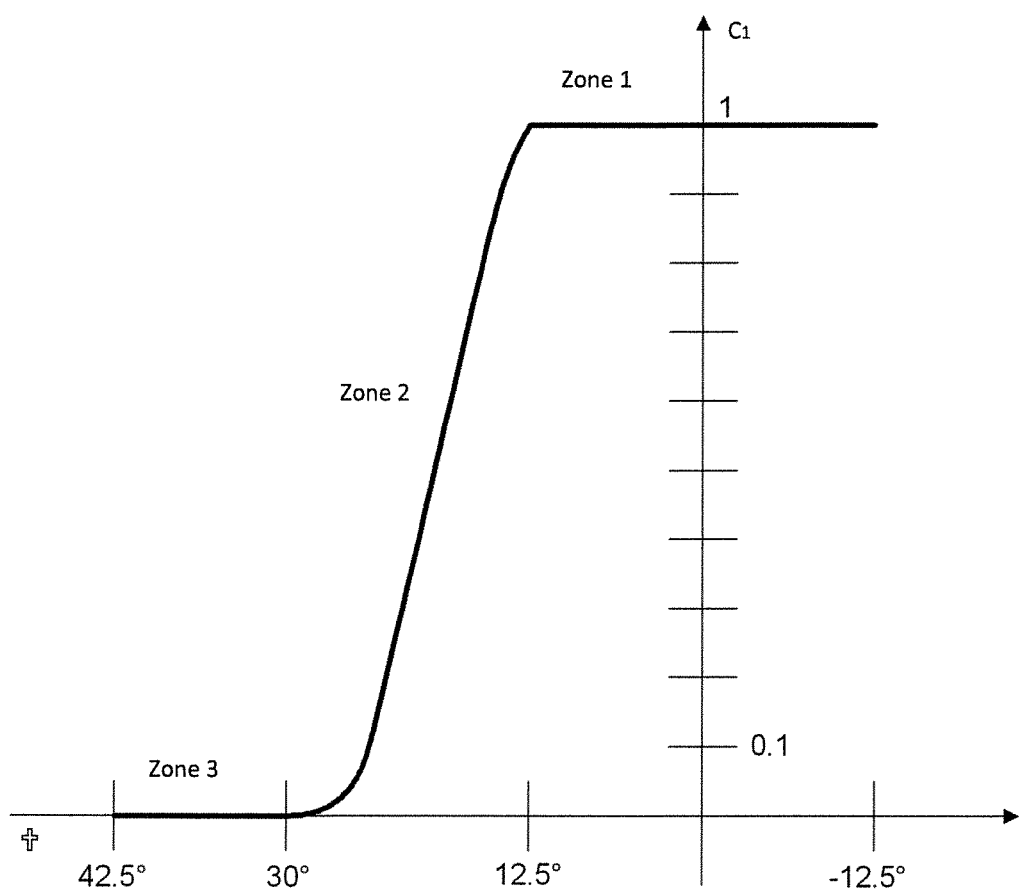
FIG. 4 represents an example a weighting function according to an embodiment of the invention.

With
Z1 and Z2 the zones defined in FIG. 3,
$Nb_{Z1}$ the number of light rays that have arrived in Zone 1 after having passed through an annular step of the working lens,
$Nb_{Z2}$ the number of light rays that have arrived in Zone 2 after having passed through an annular step of the working lens,
$P_i$ the photonic weight of the light ray i, based on the number of crossed optical diopters,
$C_{1i}$ the weight of the light ray i based on a first criterion for example, the zone of the light receiver as illustrated on FIG. 4,
$C_{2i}$ the weight of the light ray i based on a second criterion, for example, the angle of incidence of the light ray as illustrated on FIGS. 5a and 5b, and
β a weight factor, for example β=0.25.

During the modifying stage S4, at least on annular step, or the annular steps considered in the cost function is modified. For example, the angle and/or position and/or cross-section shape of the annular step is modified.

According to an embodiment of the invention, the position and cross-section shape of the annular step is maintained constant and different angles of the annular step are tested. The angle of the annular step may be defined as the angle between the cross section of the annular step and the normal to the surface of the lens at the center of the lens.

According to the invention, the evaluation and modifying steps are repeated so as to determine a minimum of the cost function. Thus reducing the number of light rays that are received by the receiver and that have passed through the annular step. Therefore, the parasite images produced by the annular step are reduced providing a greater comfort to the wearer.

The invention also relates to a manufacturing method for manufacturing an optical lens optimized by a method according to the invention. For example, the manufacturing method may comprise an optical lens data providing stage during which optical lens data corresponding to the optimized optical lens according to the method of the invention is provided and a manufacturing stage during which the optimized optical lens is manufactured.

The invention has been described above with the aid of embodiments without limitation of the general inventive concept.

The invention claimed is:

1. A method implemented by a computer for optimizing an optical lens adapted to a wearer, the method comprising:
    obtaining information from an initial optical system comprising at least a light source, a light receiver and an initial optical lens placed between the light source and the light receiver, the initial optical lens comprising at least a Fresnel zone, the Fresnel zone comprising at least two discontinuous optically functional annular sections joined by at least one annular step;
    defining a working optical lens to be equal to the initial optical lens;
    performing an evaluation of the obtained information using a cost function related to the number of light rays received by the light receiver from the light source that have passed through the annular step of the working optical lens;
    modifying the annular step of the working optical lens based on the evaluation,
    wherein the performing the evaluation and modifying the annular step are repeated to minimize the cost function, thus reducing the number of light rays received by the light receiver from the light source that have passed through the annular step of the working optical lens, and
    wherein the light receiver is at the locus of the wearer's pupil points when the wearer's eye rotates in all directions; and
    outputting optimized optical lens information of a final working optical lens once the repetition of the performing the evaluation and modifying the annular step is complete,
wherein
    the cost function Fm is given by $$Fm = \sum_{Z1} [(P_i \times C_{1i} \times C_{2i}) + (\beta \times Nb_{Z1})] \times \left[\sum_{Z2} (P_i \times C_{1i} \times C_{2i})\right] / (Nb_{Z2} + 1)$$

where
    Z1 and Z2 are vision zones of the light receiver that receives the light ray,
    $Nb_{Z1}$ is the number of light rays that have arrived in zone 1 after having passed through an annular step of the working lens,
    $Nb_{Z2}$ is the number of light rays that have arrived in zone 2 after having passed through an annular step of the working lens,
    Pi is the photonic weight of the light ray i, based on the number of crossed optical diopters,
    $C_{1i}$ is the weight of the light ray i based on a first criterion,
    $C_{2i}$ is the weight of the light ray i based on a second criterion, and
    β is a weight factor.

2. The method according to claim 1, wherein during the modifying the annular step, an angle and/or a position and/or a cross-section shape of the annular step is modified.

3. The method according to claim 1, wherein the cost function is calculated by attributing different weights to each light ray received by the light receiver according to the zone of the light receiver that receives the light ray.

4. The method according to claim 1, wherein the light receiver is divided in three zones, the first zone corresponding to a central vision zone, the second zone corresponding to an intermediate vision zone and the third zone corresponding to a peripheral vision zone.

5. The method according to claim 1, wherein the cost function is calculated by attributing different weights to each light ray received by the light receiver according to the angle of incidence with which the light ray is received by the light receiver.

6. The method according to claim 1, wherein the cost function is calculated by attributing different weights to each light ray received by the receiver according to their photometric energy.

7. The method according to claim 1, wherein the Fresnel zone comprises a plurality of discontinuous optically functional annular sections joined by a plurality of annular steps and the method further comprises an evaluation zone providing stage during which an evaluation zone of the Fresnel zone is provided and the evaluation stage is carried out only for the annular steps comprising the evaluation zone.

8. The method according to claim 7, wherein the evaluation zone comprises a plurality of annular steps and the cost function is calculated by attributing different weights to each light ray received by the light receiver according to which annular step the light ray has passed through before being received by the receiver.

9. The method according to claim 1, wherein the initial optical system comprises a plurality of light sources.

10. The method according to claim 9, wherein the cost function is calculated by attributing different weights to each light ray received by the light receiver according to which light source the light ray is issued from.

11. The method according to claim 9, wherein the light sources energy and distribution are adapted to correspond to a visual situation.

12. The method according to claim 1, further comprising: manufacturing an optical lens based on the optimized optical lens information.

13. A non-transitory computer readable medium carrying sequences of instructions that are accessible to the computer and which, when executed by the computer, cause the computer to carry out the method of claim 1.

14. The method according to claim 1, wherein the cost function is related to the number of light rays received by the light receiver from the light source that have passed through the annular step of the working optical lens by the number of light rays being included in the cost function as a plurality of different variables.

* * * * *